United States Patent
Ninomiya et al.

(10) Patent No.: US 7,541,574 B2
(45) Date of Patent: Jun. 2, 2009

(54) SENSOR DEVICE

(75) Inventors: Yasunori Ninomiya, Kariya (JP);
Ryuichiro Abe, Ichinomiya (JP)

(73) Assignee: DENSO CORPORATION, Kariya (JP)

( * ) Notice: Subject to any disclaimer, the term of this patent is extended or adjusted under 35 U.S.C. 154(b) by 28 days.

(21) Appl. No.: 11/802,612

(22) Filed: May 24, 2007

(65) Prior Publication Data
US 2007/0284713 A1 Dec. 13, 2007

(30) Foreign Application Priority Data
Jun. 12, 2006 (JP) ............... 2006-162192

(51) Int. Cl.
*G01P 15/00* (2006.01)
*H01J 5/02* (2006.01)
(52) U.S. Cl. .................. 250/239; 73/514.01
(58) Field of Classification Search .......... 250/239, 250/216; 73/510–511, 514.01, 514.26, 514.34
See application file for complete search history.

(56) References Cited

U.S. PATENT DOCUMENTS 5,691,471 A * 11/1997 Okazaki et al. .......... 73/504.04
6,895,819 B1    5/2005 Yachi

FOREIGN PATENT DOCUMENTS

JP    A-8-035983    2/1996

* cited by examiner

*Primary Examiner*—Kevin Pyo
(74) *Attorney, Agent, or Firm*—Posz Law Group, PLC (57) ABSTRACT

A sensor device includes a board, a sensor element and a resin member made of resin. The sensor element has a displace part to be displaced in a predetermined detection direction, and detects a displace amount of the displace part in the detection direction. The sensor element is mounted and connected to the board through the resin member. The resin member is arranged between the sensor element and the board in part such that a warp of the sensor element in the detection direction due to a temperature variation is smaller than a warp of the sensor element in a direction except for the detection direction.

15 Claims, 6 Drawing Sheets

SENSOR DEVICE

CROSS REFERENCE TO RELATED APPLICATION

This application is based on Japanese Patent Application No. 2006-162192 filed on Jun. 12, 2006, the disclosure of which is incorporated herein by reference in its entirety.

BACKGROUND OF THE INVENTION

1. Field of the Invention

The present invention relates to a sensor device, in which a sensor element having a displace part is mounted on a board through a resin member.

2. Description of Related Art

JP-A-8-35983 discloses a sensor device including a board and a sensor element. The sensor element includes a displace part to be displaced in a predetermined detection direction, and detects a displace amount of the displace part in the detection direction. The sensor element is mounted on the board through a resin member made of resin, and the sensor element is connected to the board through the resin member.

Here, the board is made of ceramic or resin, or the board is constructed by a semiconductor substrate. The sensor element represents an acceleration sensor element or an angular speed sensor element, for example. The sensor element includes a movable part as the displace part, and the movable part is displaced in the detection direction due to acceleration or angular speed.

Further, adhesive made of epoxy resin is used as the resin member. The sensor element is mounted on the board through the resin member, and the resin member is heated to be hardened.

Figure 6A:
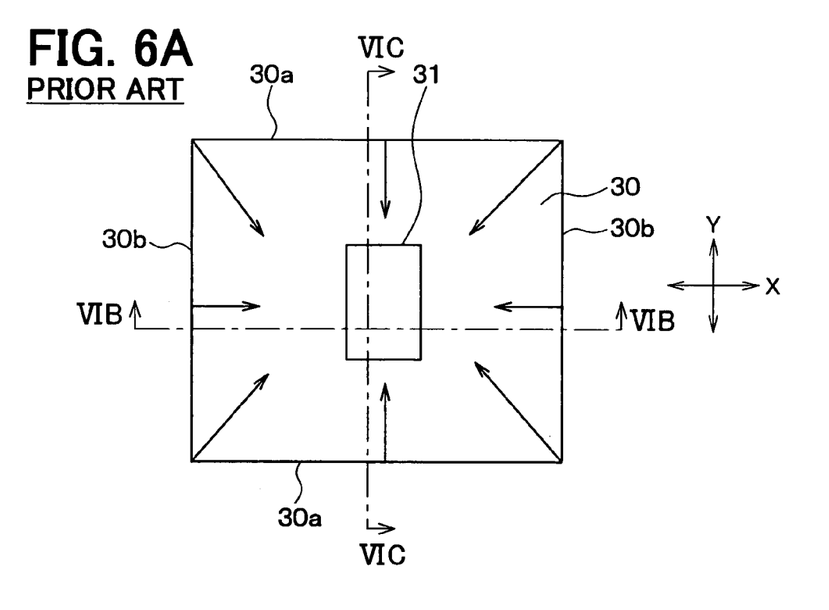
FIG. 6A is a plan view showing a conventional sensor device.
Figure 6B:
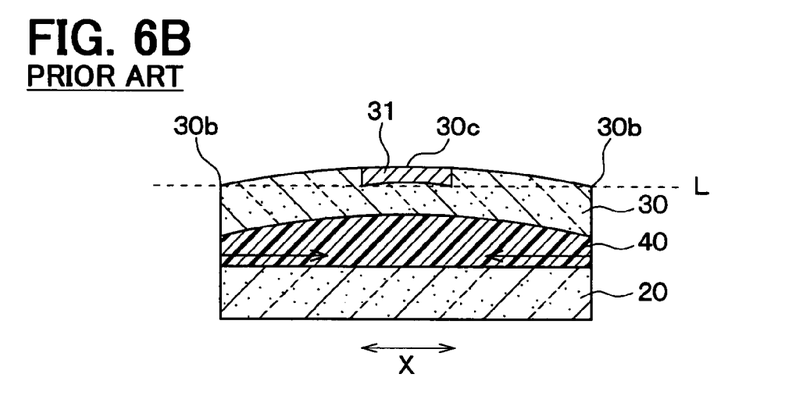
FIG. 6B is a schematic cross-sectional view showing the conventional sensor device taken along line VIB-VIB in FIG. 6A.
Figure 6C:
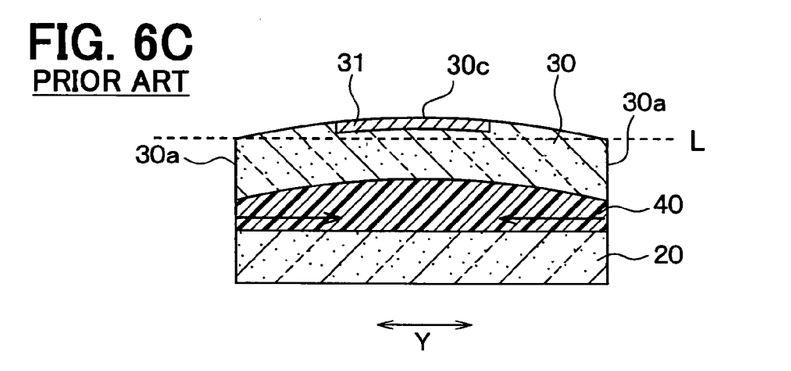
FIG. 6C is a schematic cross-sectional view showing the conventional sensor device taken along line VIC-VIC in FIG. 6A.

FIGS. 6A, 6B and 6C show a conventional sensor device. FIG. 6A is a plan view showing the conventional sensor device. FIG. 6B is a schematic cross-sectional view showing the conventional sensor device taken along line VIB-VIB in FIG. 6A. FIG. 6C is a schematic cross-sectional view showing the conventional sensor device taken along line VIC-VIC in FIG. 6A.

The conventional sensor device includes a sensor element 30 and a board 20. The sensor element 30 includes a displace part 31, and is fixed on the board 20 through a resin member 40. The displace part 31 is displaced in a detection direction Y. The resin member 40 is arranged under the whole sensor element 30.

Experiments and simulations are performed by using the conventional sensor device. When a temperature variation is generated, the sensor element 30 is warped as shown in FIGS. 6B and 6C, although the sensor element 30 is originally flat. Specifically, because end portions 30a, 30b of the sensor element 30 are fixed to the resin member 40, middle part of the sensor element 30 is warped to protrude outward. A reason for the warp of the sensor element 30 will be described below.

When the resin member 40 is heated to connect the board 20 and the sensor element 30, each of the board 20, the sensor element 30 and the resin member 40 expands. In contrast, when the resin member 40 is cooled toward a room temperature, each of the board 20, the sensor element 30 and the resin member 40 contracts. The temperature variation is generated when the conventional sensor device is manufactured. In addition to the manufacture time, the temperature variation is generated when the conventional sensor device is used. Due to an environmental temperature variation, each of the board 20, the sensor element 30 and the resin member 40 expands or contracts.

Here, the expansion and the contraction of the sensor element 30 are smaller than those of the resin member 40 and the board 20, because the sensor element 30 is made of semiconductor. Therefore, when the temperature variation is generated, the sensor element 30 is warped due to a thermal deformation of the resin member 40 and a thermal expansion difference between the sensor element 30 and the board 20.

In this case, as shown of arrows in FIG. 6A, the sensor element 30 is warped in almost all directions including the detection direction Y. Because almost all peripheries of the end portions 30a, 30b of the sensor element 30 are fixed to the resin member 40, stress of the resin member 40 is applied to an approximately center part of the sensor element 30 from the almost all peripheries of the end portions 30a, 30b of the sensor element 30.

FIG. 6B shows the warp of the sensor element 30 in a direction X approximately perpendicular to the detection direction Y. FIG. 6C shows the warp of the sensor element 30 in the detection direction Y. Here, when the sensor element 30 is cut parallel to the direction X, Y in a thickness direction, the warp of the sensor element 30 in the direction X, Y represents that a center part 30c of the cross-section of the sensor element 30 departs from an imaginary line L. The imaginary line L is defined to connect ends of the cross-section in the direction X, Y, and represents a flat state of the sensor element 30 not having the warp.

If the sensor element 30 is warped in the detection direction Y, deviation or error may be generated in the displace amount of the displace part 31, and the displace amount of the displace part 31 may not accurately be detected. For example, a capacitive physical quantity sensor includes a movable part to be displaced in the detection direction Y when a physical quantity, e.g., acceleration is applied to the sensor. The physical quantity can be detected based on a variation in a distance between the movable part and a fixed part opposing to the movable part in the detection direction Y.

Here, when the sensor element 30 is warped in the detection direction Y, the variation in the distance between the movable part and the fixed part, that is, the displace amount, departs from a designed relationship between the physical quantity and the displace amount. Thus, error may be generated in the detection accuracy. Especially, if the sensor element 30 is warped due to the temperature variation when the sensor device is used, the warp of the sensor element 30 may affect the detection accuracy.

SUMMARY OF THE INVENTION

In view of the foregoing and other problems, it is an object of the present invention to provide a sensor device, in which a sensor element having a displace part is mounted on a board through a resin member.

According to a first example of the present invention, a sensor device includes a board, a sensor element and a first resin member made of resin. The sensor element has a displace part to be displaced in a predetermined detection direction, and detects a displace amount of the displace part in the detection direction. The sensor element is mounted and connected to the board through the first resin member. The first resin member is arranged between the sensor element and the board in part such that a warp of the sensor element in the detection direction due to a temperature variation is smaller than a warp of the sensor element in a direction except for the detection direction.

According to a second example of the present invention, a sensor device includes a board, a sensor element and a first resin member made of resin. The sensor element has a displace part to be displaced in a predetermined detection direction, and detects a displace amount of the displace part in the detection direction. The sensor element has an end portion at each end of the sensor element in a direction approximately perpendicular to the detection direction. The first resin member is arranged only under the end portion of the sensor element. The end portion of the sensor element is connected to the board through the first resin member.

Accordingly, warp of the sensor element can be reduced so that detection accuracy of the sensor device can be kept better.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

First Embodiment

An acceleration sensor device 100 of a first embodiment will be described with reference to FIGS. 1A, 1B and 1C. The acceleration sensor device 100 is used as an acceleration sensor or a gyro sensor of a vehicle, in which an air-bag, anti-lock brake system (ABS) or vehicle stability control (VSC) is controlled, for example.

The acceleration sensor device 100 includes a sensor element 30, a circuit chip 20 (first board), a ceramic package 10 (second board), a first resin member 40 and a second resin member 50. The circuit chip 20 is supported by the ceramic package 10 through the second resin member 50, and the sensor element 30 is supported by the circuit chip 20 through the first resin member 40. The first resin member 40 connects the circuit chip 20 and the sensor element 30, and the second resin member 50 connects the ceramic package 10 and the circuit chip 20.

The ceramic package 10 accommodates the sensor element 30 and the circuit chip 20, and works as a base for partitioning and forming a main body of the acceleration sensor device 100. The ceramic package 10 is mounted to an appropriate position of an object to be measured, and the acceleration sensor device 100 electrically communicates with outside through the ceramic package 10.

The ceramic package 10 is a multi-layer board, in which plural ceramic layers, e.g., alumina, are stacked. Wirings (not shown) of the ceramic package 10 are arranged on a surface of each layer, or in a through hole provided in each layer. The acceleration sensor device 100 can be electrically connected to outside through the wirings.

The circuit chip 20 is mounted on a bottom face of the ceramic package 10, and fixed to the ceramic package 10 through the second resin member 50 made of resin. A detection circuit is formed in the circuit chip 20, and processes a signal output from the sensor element 30. For example, a MOS transistor element is formed in a semiconductor substrate, e.g., silicon board, by using a semiconductor process, to form the detection circuit in the circuit chip 20.

The sensor element 30 is mounted on the circuit chip 20 through the first resin member 40 made of resin. The first resin member 40 connects the circuit chip 20 and the sensor element 30 to be fixed.

The circuit chip 20 is the first board, on which the sensor element 30 is connected, and the ceramic package 10 is the second board disposed under the circuit chip 20 to support the circuit chip 20.

The first board and the second board are connected through the second resin member 50, and the first board and the second board are integrated. The sensor element 30 is connected to the integrated board through the first resin member 40.

Here, the sensor element 30 includes a displace part 31 to be displaced in a predetermined detection direction Y, and detects a displace amount of the displace part 31 in the detection direction Y. The sensor element 30 is an acceleration sensor element, and detects an acceleration in the detection direction Y based on the displace amount of the displace part 31 in the detection direction Y.

The sensor element 30 has a rectangular board shape. The sensor element 30 has ends 30a opposing to each other, and the detection direction Y corresponds to a direction, in which the ends 30a of the sensor element 30 oppose to each other. Further the sensor element 30 has ends 30b opposing to each other, and a direction X corresponds to a direction, in which the ends 30b of the sensor element 30 oppose to each other. The direction X is approximately perpendicular to the detection direction Y.

Here, each of the first resin member 40 and the second resin member 50 is made of thermosetting resin. When the first resin member 40 is disposed between the circuit chip 20 and the sensor element 30, and when the first resin member 40 is heated to be hardened, the first resin member 40 connects the circuit chip 20 and the sensor element 30. When the second resin member 50 is disposed between the ceramic package 10 and the circuit chip 20, and when the second resin member 50 is heated to be hardened, the second resin member 50 connects the ceramic package 10 and the circuit chip 20.

The first resin member 40 and the second resin member 50 are made of the same thermosetting resin or different thermosetting resins. Further, conductive particles or non-conductive particles may be added into the resin member 40, 50. That is, any resin capable of connecting can be used as the resin member 40, 50.

When the resin member 40, 50 is made of only the thermosetting resin, or when the particles are added into the resin member 40, 50, the resin member 40, 50 may have a glass-transition temperature equal to or larger than 100° C. Thereby, the resin member 40, 50 can have a better adhesion strength. Further, the thermosetting resin constructing the resin member 40, 50 may have a thermal expansion coefficient equal to or smaller than 300 ppm/° C. when the resin member 40, 50 has a temperature in a range between −40° C. and 150° C.

Specifically, the resin member 40, 50 is made of epoxy resin or polyimide resin, for example. Further, the resin material to be hardened by heating may have a film shape or a paste shape.

The first resin member 40 is arranged between the circuit chip 20 and the sensor element 30 in part, i.e., not in whole, such that a warp of the sensor element 30 in the detection direction Y due to the temperature variation becomes smaller than that of the sensor element 30 in a direction except for the detection direction Y.

The warp of the sensor element 30 in the detection direction Y represents that a center part 30c of a cross-section of the sensor element 30 departs from an imaginary line L connecting the both ends 30a of the cross-section, when the sensor element 30 is cut parallel to the detection direction Y in a thickness direction, as shown of a conventional sensor device in FIG. 6C. The temperature variation may be generated when the sensor device 100 is manufactured, or when the sensor device 100 is used, for example.

Figure 1A:
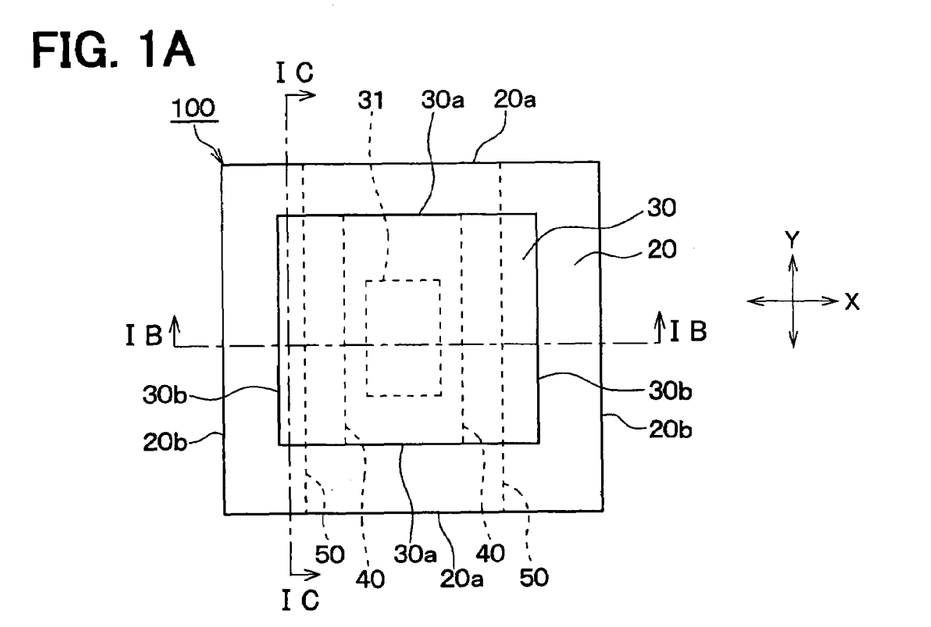
FIG. 1A is a plan view showing an acceleration sensor device according to a first embodiment of the present invention.
Figure 1B:
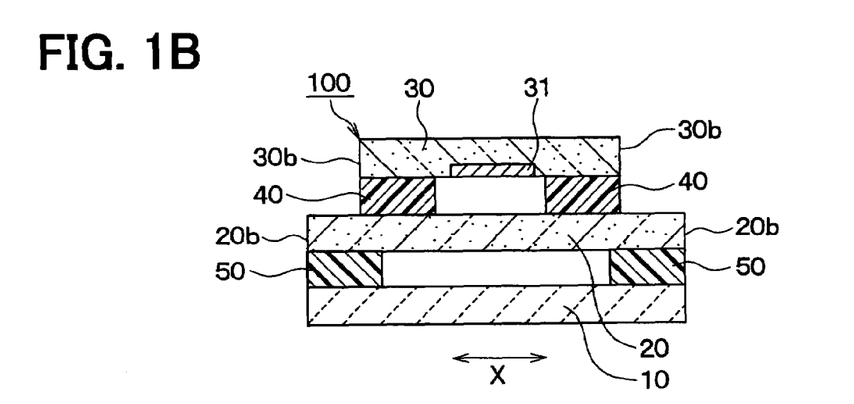
FIG. 1B is a schematic cross-sectional view showing the acceleration sensor device taken along line IB-IB in FIG. 1A.

However, in the first embodiment, as shown in FIG. 1B, the first resin member 40 is not arranged under the displace part 31 of the sensor element 30. The first resin member 40 is not arranged under the sensor element 30 extending from the displace part 31 parallel to the detection direction Y. That is, the first resin member 40 is arranged under only both end portions 30b of the sensor element 30. The end portions 30b oppose to each other in the direction X approximately perpendicular to the detection direction Y.

The detection direction Y corresponds to a longitudinal direction of the end portion 30b. The first resin member 40 extends parallel to the detection direction Y under the end portion 30b. The end portions 30b of the sensor element 30 are connected to the circuit chip 20 through the first resin member 40.

In contrast, the displace part 31 of the sensor element 30, and the sensor element 30 extending from the displace part 31 parallel to the detection direction Y are not connected to the circuit chip 20 or the first resin member 40. That is, the displace part 31 of the sensor element 30 and the sensor element 30 extending from the displace part 31 parallel to the detection direction Y are spaced from the circuit chip 20 without the first resin member 40.

Further, the second resin member 50 is arranged between the circuit chip 20 and the ceramic package 10 in part, i.e., not in whole, such that a warp of the circuit chip 20 in the detection direction Y due to the temperature variation is smaller than that of the circuit chip 20 in a direction except for the detection direction Y.

Here, the warp of the circuit chip 20 in the detection direction Y is approximately similar to the warp of the sensor element 30. That is, when the circuit chip 20 is cut parallel to the detection direction Y in a thickness direction, a center part of the cross-section of the circuit chip 20 departs from an imaginary line connecting both ends of the cross-section in the detection direction Y.

Specifically, as shown in FIG. 1B, the second resin member 50 is not arranged under the circuit chip 20 overlapping with the displace part 31 of the sensor element 30. The second resin member 50 is not arranged under the circuit chip 20 extending from the overlap part parallel to the detection direction Y. That is, the second resin member 50 is arranged under both end portions 20b of the circuit chip 20. The end portions 20b oppose to each other in the direction X approximately perpendicular to the detection direction Y. The circuit chip 20 overlapping with the displace part 31 of the sensor element 30 and extending from the overlap part parallel to the detection direction Y is spaced from the ceramic package 10 without the second resin member 50.

The circuit chip 20 has a rectangular board shape, and ends 20a of the circuit chip 20 oppose to each other in the detection direction Y. The end portions 20b of the circuit chip 20 oppose to each other in the direction X approximately perpendicular to the detection direction Y, and the second resin member 50 is arranged only under the end portions 20b. The second resin member 50 extends parallel to the detection direction Y. The end portions 20b of the circuit chip 20 are connected to the ceramic package 10 through the second resin member 50.

In contrast, the circuit chip 20 corresponding to the displace part 31 of the sensor element 30, and the circuit chip 20 extending from the corresponding part to the ends 20a in the detection direction Y are not connected to the ceramic package 10 or the second resin member 50.

Here, the sensor element 30, the circuit chip 20 and the ceramic package 10 are electrically connected to each other through the resin member 40, 50. Electrical signals can be sent and received among the sensor element 30, the circuit chip 20 and the ceramic package 10. The sensor element 30, the circuit chip 20 and the ceramic package 10 are electrically connected through a known bonding wire or bump (not shown).

For example, the sensor element 30 has a first face opposing to the circuit chip 20, and a bump is provided on the first face of the sensor element 30. When the first resin member 40 exists on a face of the circuit chip 20 opposing to the bump, the first resin member 40 is heated to be softened, and the bump is pushed toward the circuit chip 20. Thus, the bump passes through the first resin member 40 to be in contact with the circuit chip 20. Thus, the circuit chip 20 and the sensor element 30 can be electrically connected to each other through the bump.

Further, when the conductive particles such as metal particles, e.g., silver or copper, are added in the resin member 40, 50, the resin member 40, 50 can be conductive. Therefore, the sensor element 30, the circuit chip 20 and the ceramic package 10 can be electrically connected to each other through the resin member 40, 50 as a conductive connection member.

Figure 1C:
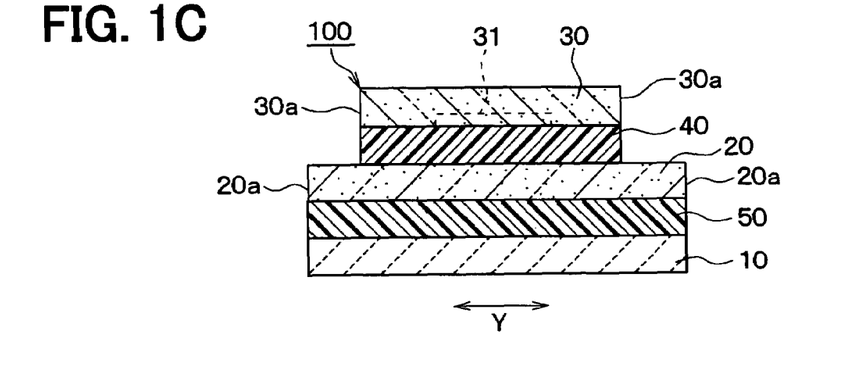
FIG. 1C is a schematic cross-sectional view showing the acceleration sensor device taken along line IC-IC in FIG. 1A.
Figure 2:
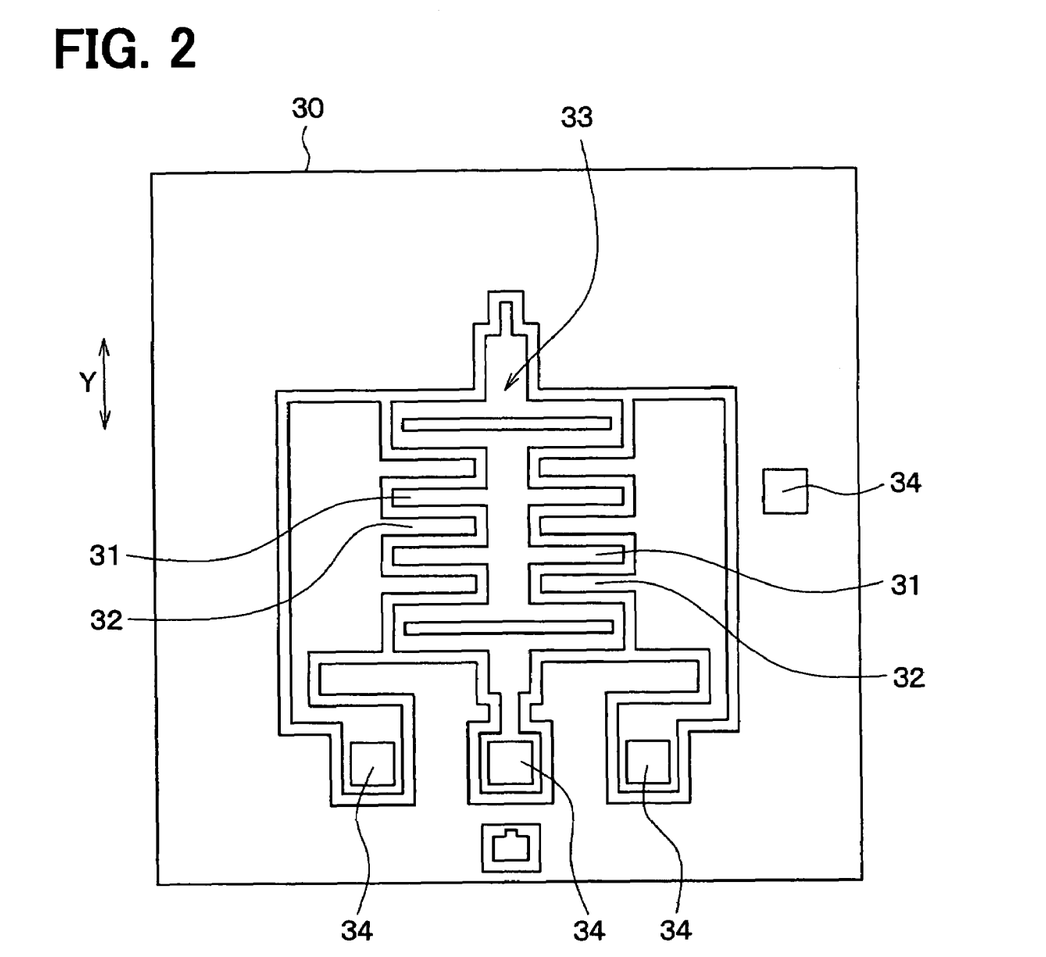
FIG. 2 is a schematic plan view showing a displace part of a sensor element of the acceleration sensor device.

Here, as shown in FIGS. 1A, 1B and 1C, the displace part 31 of the sensor element 30 is arranged on the first face of the sensor element 30, and the first face of the sensor element 30 opposes to the circuit chip 20. FIG. 2 shows a schematic plan view of the first face of the sensor element 30, as an example.

The sensor element 30 is made of a semiconductor chip. For example, the sensor element 30 is made of a silicon-on-insulator (SOI) board, in which a first silicon board and a second silicon board are connected through an oxide film.

The sensor element 30 is a capacitive acceleration sensor chip for detecting acceleration based on a capacitance variation between a movable electrode and a fixed electrode. The capacitive acceleration sensor chip will be briefly described with reference to FIG. 2.

The sensor element 30 has a beam structure 33 including a movable electrode 31 and a fixed electrode 32, and the movable electrode 31 and the fixed electrode 32 oppose to each other. When acceleration, i.e., physical quantity, is applied in the detection direction Y, the movable electrode 31 is displaced in the detection direction Y. Thus, the movable electrode 31 works as the displace part 31.

The sensor element 30 has a pad 34 in order to output an electrical signal. The bonding wire, the bump or the conductive connection member electrically connects the first resin member 40 and the pad 34 of the sensor element 30.

A signal of the capacitance between the electrodes 31, 32 is varied based on a displace amount of the movable electrode 31 in the detection direction Y. The signal of the capacitance is output into the circuit chip 20, and the output signal is converted into another signal, e.g., voltage, in the circuit chip 20.

The converted signal is transmitted to the ceramic package 10, and output outside through the wiring provided in the ceramic package 10. Thus, the applied acceleration can be detected.

Next, a method of manufacturing the sensor device 100 will be described, as an example. The sensor element 30 is formed by processing the semiconductor board, e.g., SOI board, using a known semiconductor producing technology.

The first resin member 40 having a pattern shown in FIG. 1A is arranged between the sensor element 30 and the circuit chip 20. The sensor element 30 and the circuit chip 20 are bonded through the first resin member 40. When a paste material is used as the first resin member 40, the paste material is coated or printed between the sensor element 30 and the circuit chip 20. When a film material is used as the first resin member 40, the film material is cut into a predetermined shape, and temporarily pressure-connected between the sensor element 30 and the circuit chip 20.

Thereafter, the first resin member 40 is heated and pressed to be hardened. Thus, the sensor element 30 and the circuit chip 20 are connected through the first resin member 40. For example, when a film made of epoxy resin is used as the first resin member 40, a condition for the temporal pressure-connecting is at about 50° C.-80° C. for about 5-10 minutes. A condition for the hardening is at about 150° C. for about one hour or more, for example.

Next, the second resin member 50 having a pattern shown in FIG. 1A is arranged between the ceramic package 10 and the circuit chip 20. The ceramic package 10 and the circuit chip 20 are bonded through the second resin member 50. Then, the second resin member 50 is heated and pressed to be hardened. Thus, the ceramic package 10 and the circuit chip 20 are connected through the second resin member 50.

An arrangement and a hardening condition for the second resin member 50 are approximately similar to those for the first resin member 40. Here, an order for connecting the sensor element 30, the circuit chip 20 and the ceramic package 10 is not limited to the above description.

For example, firstly, the circuit chip 20 and the ceramic package 10 may be connected through the second resin member 50, then, the sensor element 30 may be connected to the circuit chip 20 through the first resin member 40. Alternatively, the sensor element 30, the circuit chip 20 and the ceramic package 10 may be integrally connected through the first resin member 40 and the second resin member 50 by heating and pressing.

After the connecting, wire bonding is performed if needed. Thus, the sensor device 100 can be produced.

According to the first embodiment, the first resin member 40 is arranged between the circuit chip 20 and the sensor element 30 in part such that a warp of the sensor element 30 in the detection direction Y due to the temperature variation is smaller than that of the sensor element 30 in a direction except for the detection direction Y. Conventionally, the first resin member is arranged under the whole sensor element. However, according to the first embodiment, even if the temperature variation is generated, the warp of the sensor element 30 in the detection direction Y can be reduced. Therefore, detection accuracy of the sensor device 100 can be kept better, because the warp of the sensor element 30 can be reduced.

Especially, the first resin member 40 is not arranged under the displace part 31 of the sensor element 30. The first resin member 40 is not arranged under a location extending from the displace part 31 parallel to the detection direction Y. The first resin member 40 is arranged under the end portions 30b of the sensor element 30, and the end portions 30b are fixed to the circuit chip 20 through the first resin member 40.

Figure 3A:
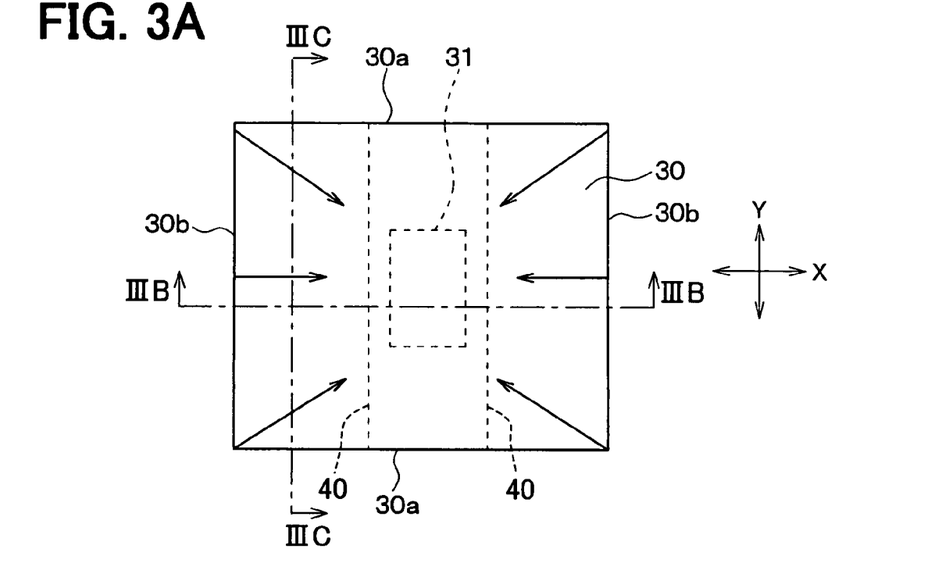
FIG. 3A is a plan view showing the sensor element of the acceleration sensor device.
Figure 3B:
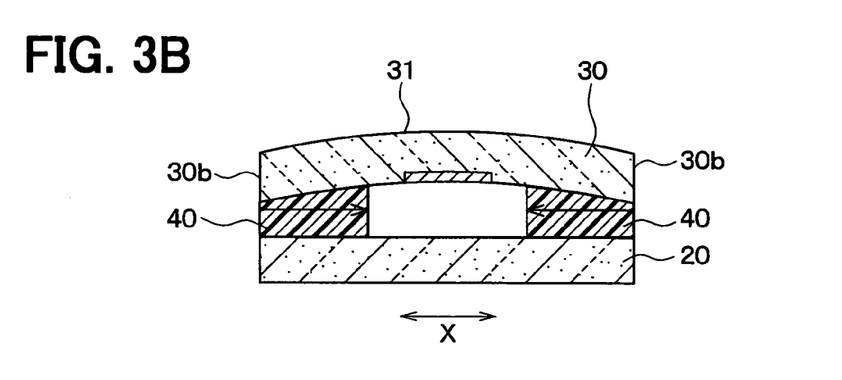
FIG. 3B is a partial schematic cross-sectional view showing the acceleration sensor device taken along line IIIB-IIIB in FIG. 3A.
Figure 3C:
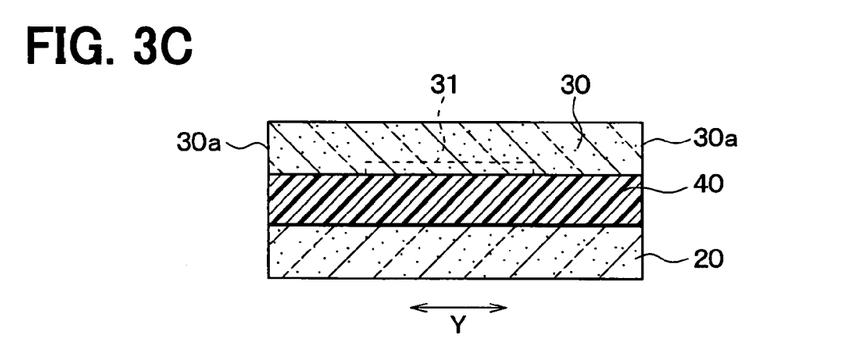
FIG. 3C is a partial schematic cross-sectional view showing the acceleration sensor device taken along line IIIC-IIIC in FIG. 3A.

Advantages of the arrangement pattern of the first resin member 40 will be described with reference to FIGS. 3A, 3B and 3C. As shown of plural arrows in FIG. 3A, stress by the first resin member 40 is applied to the sensor element 30 when a temperature variation is generated. The stress is applied toward a center part of the sensor element 30 from the ends 30a, 30b of the sensor element 30 under the sensor element 30, because the ends 30a, 30b of the sensor element 30 are fixed to the first resin member 40. Thereby, the sensor element 30 is warped in the direction X approximately perpendicular to the detection direction Y, as shown in FIG. 3B.

However, the displace part 31 and the location extending from the displace part 31 parallel to the detection direction Y are not fixed to the circuit chip 20. Therefore, even if the temperature variation is generated, stress generated toward the center part of the sensor element 30 from the ends 30a can be reduced. Thus, the warp of the sensor element 30 in the detection direction Y can be reduced, as shown in FIG. 3C.

Further, the sensor element 30 is connected to the circuit chip 20 (first board), and the circuit chip 20 is connected to the ceramic package 10 (second board) through the second resin member 50. If the second resin member 50 is thermally deformed, the circuit chip 20 may be warped. If the circuit chip 20 is warped, the sensor element 30 may be warped in the detection direction Y.

However, the warp of the sensor element 30 in the detection direction Y can be reduced when the second resin member 50 has an arrangement pattern approximately similar to the first resin member 40, because the warp of the circuit chip 20 in the detection direction Y can be reduced. Here, mechanism for reducing the warp of the circuit chip 20 in the detection direction Y is approximately similar to that for reducing the warp of the sensor element 30 in the detection direction Y.

Further, the sensor element 30 has the first face having the displace part 31, and is mounted on the circuit chip 20 such that the first face of the sensor element 30 opposes to the circuit chip 20. This is because the first resin member 40 is partially arranged under the sensor element 30. Conventionally, the first resin member is arranged under the whole sensor element. However, according to the first embodiment, the first resin member 40 is partially arranged under the sensor element 30 such that the displace part 31 of the sensor element 30 faces the circuit chip 20.

Furthermore, as shown in FIG. 3B, the warp of the sensor element 30 is bent outward, because the ends 30b of the sensor element 30 are fixed. Therefore, the first face of the sensor element 30 opposing to the ceramic package 10 and the circuit chip 20 has a diameter of an arc of the warp, which is smaller than that of a second face of the sensor element 30 opposite to the first face.

Thus, when the sensor element 30 is mounted such that the first face having the displace part 31 faces the ceramic package 10 or the circuit chip 20, the warp of the displace part 31 can be made smaller. Therefore, affect by the warp of the sensor element 30 to the displace part 31 can be reduced.

Second Embodiment

Figure 4A:
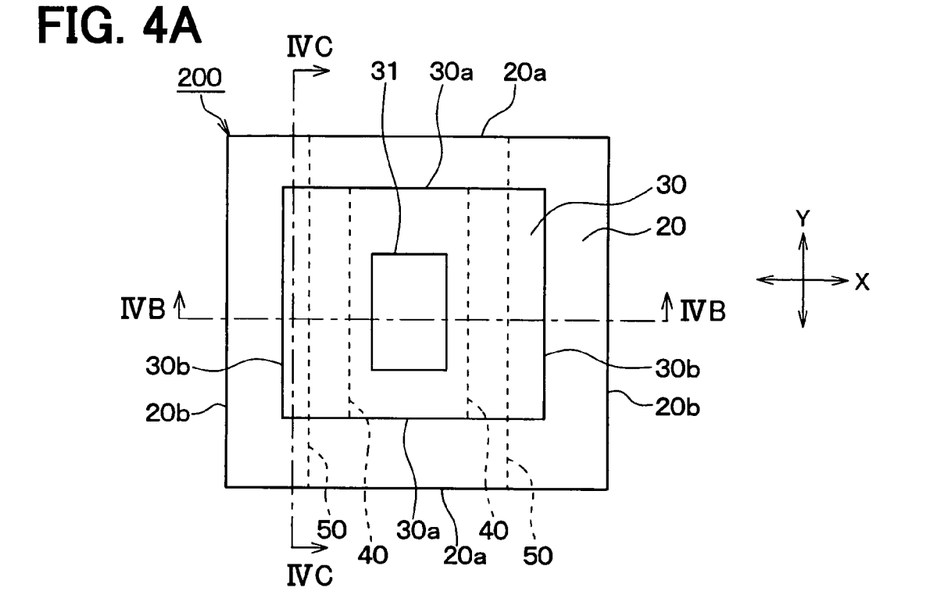
FIG. 4A is a plan view showing an acceleration sensor device according to a second embodiment of the present invention.
Figure 4B:
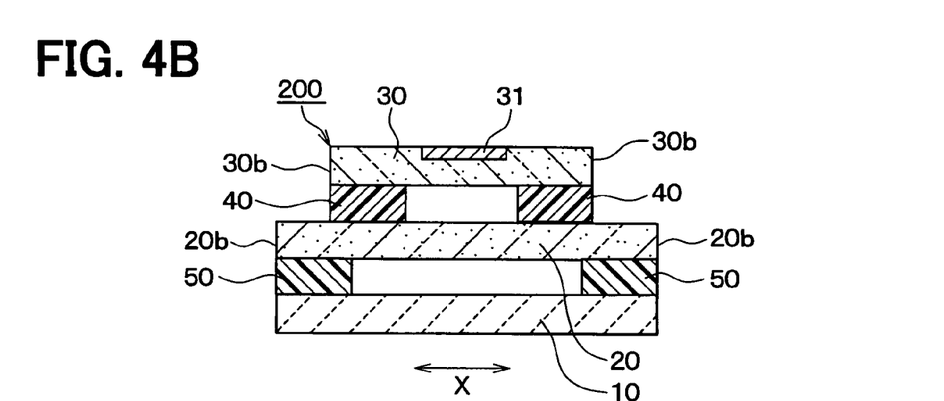
FIG. 4B is a schematic cross-sectional view showing the acceleration sensor device taken along line IVB-IVB in FIG. 4A.
Figure 4C:
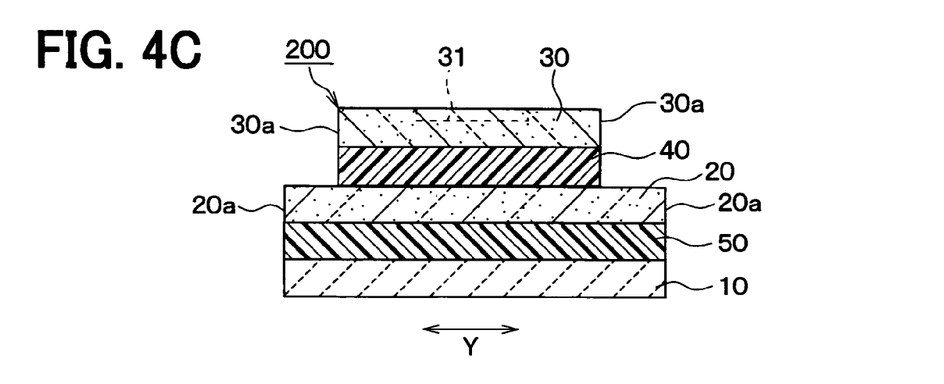
FIG. 4C is a schematic cross-sectional view showing the acceleration sensor device taken along line IVC-IVC in FIG. 4A.

An acceleration sensor device 200 in a second embodiment will be described with reference to FIGS. 4A. 4B and 4C. The displace part 31 of the sensor element 30 is arranged in the first face of the sensor element 30 facing the circuit chip 20 in the first embodiment. However, in the second embodiment, a displace part 31 of the sensor element 30 is arranged in the second face of the sensor element 30 opposite to the first face. That is, the displace part 31 faces outside in the second embodiment. The sensor element 30 is mounted on the circuit chip 20 through the first resin member 40 such that the displace part 31 of the sensor element 30 faces outside. The other parts in the second embodiment may be made similar to the first embodiment.

Therefore, approximately the same advantages can be provided in the second embodiment, except for one advantage provided when the displace part 31 is arranged in the first face having the smaller diameter of the warp.

Third Embodiment

Figure 5A:
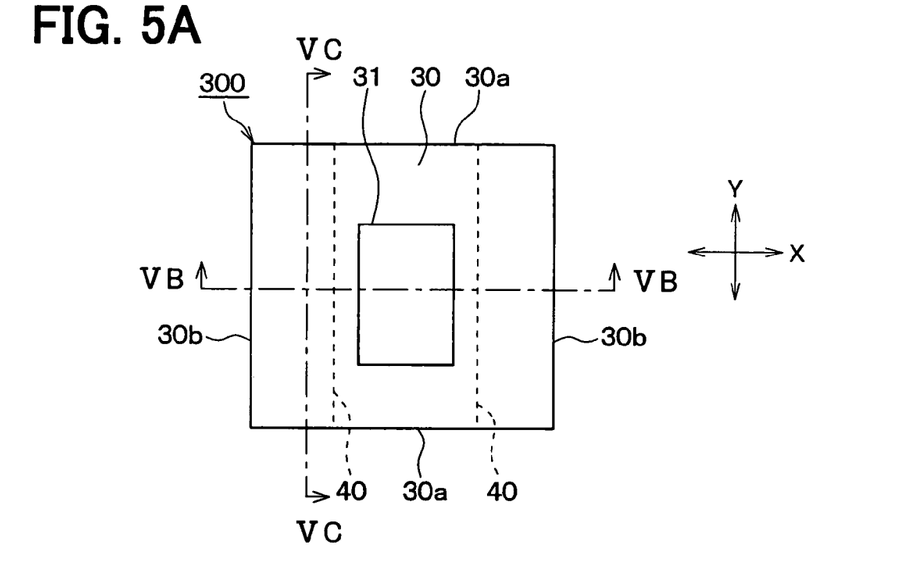
FIG. 5A is a plan view showing an acceleration sensor device according to a third embodiment of the present invention.
Figure 5B:
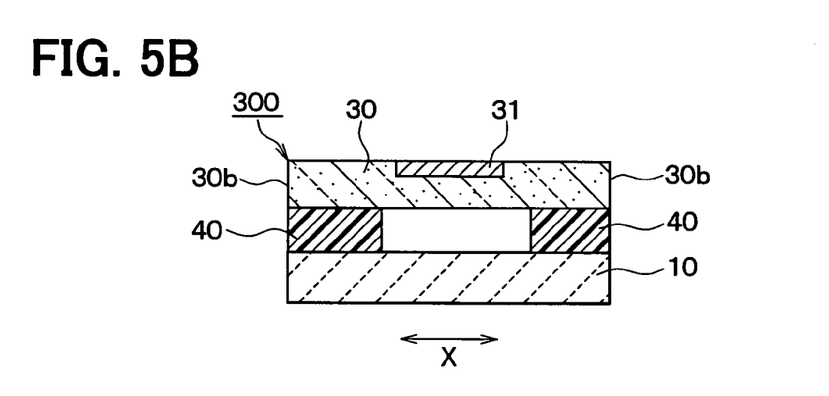
FIG. 5B is a schematic cross-sectional view showing the acceleration sensor device taken along line VB-VB in FIG. 5A.
Figure 5C:
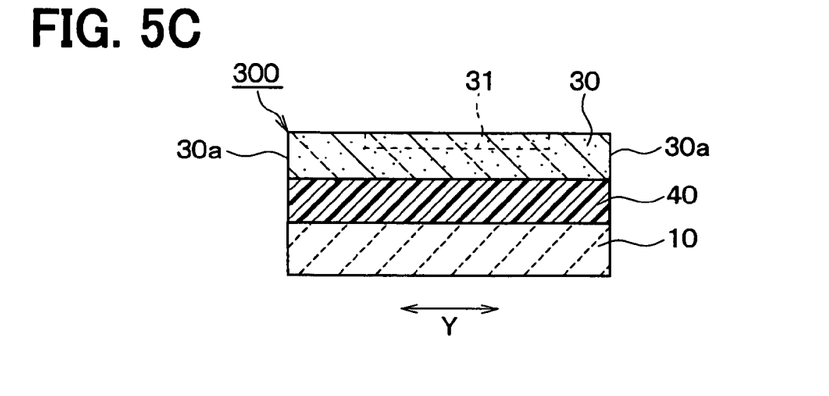
FIG. 5C is a schematic cross-sectional view showing the acceleration sensor device taken along line VC-VC in FIG. 5A.

An acceleration sensor device 300 in a third embodiment will be described with reference to FIGS. 5A. 5B and 5C. In the first and second embodiments, the sensor element 30 is connected to the circuit chip 20 (first board), and the circuit chip 20 is connected to the ceramic package 10 (second board) through the second resin member 50. However, the sensor device 300 of the third embodiment has a single layer structure. Alternatively, the sensor device 300 of the third embodiment may be a structure having three or more layers.

As shown in FIG. 5B, the sensor device 300 is constructed with the single layer structure, i.e., ceramic package 10. The circuit chip 20 and the second resin member 50 shown in FIG. 4B are eliminated in FIG. 5B. The sensor element 30 is directly connected to the ceramic package 10 through the first resin member 40.

In this case, signal processing of the sensor element 30 is performed in a circuit board (not shown) provided in the ceramic package 10. Alternatively, circuit part for processing signals may be integrally provided in the sensor element 30.

The first resin member 40 having approximately the same arrangement pattern described in the above embodiments is arranged between the sensor element 30 and the ceramic package 10. Thereby, the warp of the sensor element 30 in the detection direction Y can be reduced even if the temperature variation is generated. Thus, the detection accuracy of the sensor device 300 can be kept better.

Other Embodiments

The arrangement pattern of the first resin member 40 may be any suitable shape without departing from the scope of the present disclosure. The first resin member 40 is arranged under the sensor element 30 in part such that the warp of the sensor element 30 in the detection direction Y due to the temperature variation is smaller than that of the sensor element 30 in a direction except for the detection direction Y.

In the above embodiments, the first resin member 40 is arranged under only the end portions 30b provided at the both sides of the sensor element 30 in the direction X. However, the first resin member 40 may be arranged under the single end portion 30b provided at only one side of the sensor element 30, for example. Alternatively, the first resin member 40 may be arranged under only the displace part 31 in part. The arrangement pattern of the first resin member 40 can be determined by performing simulations and experiments using finite element analysis to have the above-described advantages.

The arrangement pattern of the second resin member 50 may be any suitable shape without departing from the scope of the present disclosure. The second resin member 50 is arranged between the circuit chip 20 and the ceramic package 10 in part such that the warp of the circuit chip 20 in the detection direction Y due to the temperature variation is smaller than that of the circuit chip 20 in a direction except for the detection direction Y. For example, the above-described modified arrangement patterns of the first resin member 40 may be used for the second resin member 50.

Further, the first board to be connected to the sensor element 30 is the circuit chip 20, and the second board to be connected to the first board is the ceramic package 10 in the above embodiments. However, any board may be used as the first board or the second board without departing from the scope of the present disclosure. Furthermore, the sensor device 100, 200, 300 may be a structure having three or more layers.

Further, the sensor element 30 detects the displace amount of the displace part 31 in the detection direction Y, and is made of the semiconductor chip in the above embodiments. Alternatively, the sensor element 30 may be made of a piezoelectric member, which is displaced by a physical quantity and outputs an electrical signal.

Further, the sensor element 30 has the rectangular board shape in the above embodiments. Alternatively, the sensor element 30 may be a chip having a round board shape. The sensor element 30 may be a known tuning fork-type resonator for detecting acceleration. The sensor element 30 may be an angular speed sensor element, for example, other than the acceleration sensor element.

Further, the ceramic package 10 is made of ceramic in the above embodiments. However, the package 10 may be made of resin or resin board, e.g., print board. The package 10 may be made of any suitable material without departing from the scope of the present disclosure.

Such changes and modifications are to be understood as being within the scope of the present invention as defined by the appended claims.

What is claimed is:

1. A sensor device comprising:
   a board;
   a sensor element having a displaceable part to be displaced in a predetermined detection direction, the sensor clement detecting a displacement amount of the displaceable part in the detection direction;
   a first resin member made of resin; and
   a bump provided in the first resin member, wherein
   the bump electrically connects the board and the sensor element,
   the sensor element includes a movable electrode, as the displaceable part and a fixed electrode opposed to the movable electrode, the sensor element has two end portions, which are spaced apart from one another in a direction approximately perpendicular to the detection direction, the first resin member is arranged only under the end portions of the sensor element, and the end portions of the sensor element are connected to the board through the first resin member.

2. The sensor device according to claim 1, wherein the sensor element has a rectangular board shape constructed with a first pair of ends and a second pair of ends, wherein the first pair of ends oppose to each other in the detection direction and the second pair of ends oppose to each other in a direction approximately perpendicular to the detection direction, and the first resin member extends parallel to the detection direction under the end portion of the sensor element corresponding to the second pair of ends.

3. The sensor device according to claim 1, wherein the displaceable part of the sensor element and the sensor element extending from the displaceable cart parallel to the detection direction are spaced from the board without the first resin member.

4. The sensor device according to claim 1, wherein the board is a ceramic package or a resin board.

5. The sensor device according to claim 1, wherein the board includes:

a first board, on which the sensor element is connected;

a second board for supporting to first board under the first board; and a second resin member made of resin, wherein the first board and the second board are connected through the second resin member, and the second resin member is arranged between the first board and the second board in part such that a warp of the first board in the detection direction due to the temperature variation is smaller than a warp of the first board in the direction except for the detection direction.

6. The sensor device according to claim 1, wherein the board includes:

a first board, on which the sensor clement is connected;

a second board for supporting the first board under the first board; and a second resin member made of resin, wherein the first board and the second board are connected through the second resin member, the first board has an end portion at each end of the first board in a direction approximately perpendicular to the detection direction, and the second resin member is arranged only under the end portion of the first board.

7. The sensor device according to claim 5, wherein the first board is a circuit chip to be electrically connected to the sensor element, and the second board is a ceramic package to be electrically connected to the sensor element and the circuit chip.

8. The sensor device according to claim 1, wherein the displace part is disposed on a face of the sensor element, and the sensor element is mounted on the board such that the face of the sensor element faces the board.

9. The sensor device according to claim 1, wherein the sensor element is made of a semiconductor chip.

10. The sensor device according to claim 1, wherein the first resin member has a glass-transition temperature equal to or larger than 100° C. when the first resin member is made of only a thermosetting resin, or when particles are added into the first resin member, and the first resin member has a thermal expansion coefficient equal to or smaller than 300 ppm/° C. when the first resin member has a temperature in a range between −40° C. and 150° C.

11. The sensor device according to claim 1, wherein the board, the sensor element and the detection direction are parallel to each other.

12. The sensor device according to claim 1, wherein the first resin member bas two portions, which are spaced from each other in the direction approximately perpendicular to the detection direction, and the displaceable part and a periphery of the displaceable part are spaced from the board between the two portions of the first resin member.

13. A sensor device comprising:

aboard;

a sensor element having a displaceable part; and a pair of resin members, which, are made of resin, wherein the sensor element is constructed and arranged to be displaced in a predetermined detection direction, the sensor element detects a displacement amount of the displaceable part in the detection direction, the sensor clement is electrically connected to the board, the sensor element has two end portions, which are spaced apart from one another in a direction approximately perpendicular to the detection direction, the displaceable part is a movable electrode of the sensor element, the sensor element includes a fixed electrode, which is opposed to the movable electrode, the resin members of the pair of resin members are separate from one another and spaced apart from one another, the resin members are arranged only under the end portions of the sensor element, respectively, and the sensor element is electrically connected to the board.

14. The sensor device of claim 13, wherein the movable electrode and the fixed electrode are comb-shaped.

15. The sensor device of claim 13, wherein the resin members are elongated and extend parallel to one another, and a longitudinal direction of the resin members is parallel to the detection direction of the sensor.

* * * * *